(12) United States Patent
Salam

(10) Patent No.: US 8,733,036 B2
(45) Date of Patent: May 27, 2014

(54) SOLAR PANEL ASSEMBLIES

(75) Inventor: Loey Abdle Salam, Ealing (GB)

(73) Assignee: Solar Roof Investments Ltd, London (GB)

( * ) Notice: Subject to any disclaimer, the term of this patent is extended or adjusted under 35 U.S.C. 154(b) by 0 days.

(21) Appl. No.: 13/188,606

(22) Filed: Jul. 22, 2011

(65) Prior Publication Data

US 2012/0199180 A1 Aug. 9, 2012

(51) Int. Cl.
*E04D 13/18* (2006.01)
*H02N 6/00* (2006.01)

(52) U.S. Cl.
USPC .................. 52/173.3; 136/251; 136/259

(58) Field of Classification Search
CPC ........ Y02B 10/10; Y02B 10/12; Y02B 10/14; Y02B 10/20; Y02E 10/50; Y02E 10/52
USPC .......... 52/173.3; 126/621, 622, 623; 136/251, 136/259; 248/237
See application file for complete search history.

(56) References Cited

U.S. PATENT DOCUMENTS

| | | | |
|---|---|---|---|
| 5,454,538 A * | 10/1995 | Merideth | 248/237 |
| 5,706,617 A | 1/1998 | Hirai et al. | |
| 5,746,839 A | 5/1998 | Dinwoodie | |
| 6,105,316 A * | 8/2000 | Bottger et al. | 52/173.3 |
| 2005/0217716 A1 | 10/2005 | Masuda et al. | |
| 2010/0212714 A1 | 8/2010 | Rothschild et al. | |
| 2011/0108083 A1 | 5/2011 | Ravestein et al. | |
| 2011/0198304 A1* | 8/2011 | Wallgren | 211/41.1 |
| 2012/0255244 A1* | 10/2012 | Hendrickson et al. | 52/173.3 |

FOREIGN PATENT DOCUMENTS

| | | |
|---|---|---|
| DE | 10 2006 026297 | 8/2007 |
| DE | 20 2008 014174 | 1/2009 |
| EP | 1597765 A2 | 11/2005 |
| EP | 1 833 098 | 9/2007 |
| EP | 2042822 A2 | 4/2009 |
| EP | 2056359 A2 | 5/2009 |
| EP | 2184560 | 5/2010 |
| EP | 2216829 A1 | 8/2010 |
| GB | 2397645 A | 7/2004 |
| JP | 59077253 | 5/1984 |
| WO | 2004/066351 A2 | 8/2004 |
| WO | 2005/117142 A1 | 12/2005 |
| WO | 2010/094354 | 8/2010 |
| WO | 2010/097406 A2 | 9/2010 |

* cited by examiner

*Primary Examiner* — Jeanette E Chapman
*Assistant Examiner* — James Buckle, Jr.
(74) *Attorney, Agent, or Firm* — Blank Rome LLP

(57) ABSTRACT

A solar panel module comprises a photovoltaic panel supported on a frame for location on a supporting surface. The frame comprises two generally parallel side walls which taper upwardly from a nose section to a rear section of the frame to provide support for the photovoltaic panel above the roof surface. The frame further comprises connections for attaching it to adjoining frames of the solar panel assembly. The rear section has a curvilinear surface which terminates in a step which extends between the side walls of the frame and is formed in its riser with at least one opening which places the interior of the frame rear section in communication with the external atmosphere. A partition wall is provided which, when the frame is positioned on a supporting surface, extends either downwardly from the step towards the supporting surface or lengthwise of the frame from the step towards the nose section to define with the two side walls (or parts thereof) a space which is closed to the external atmosphere other than through the at least one opening.

14 Claims, 9 Drawing Sheets

SOLAR PANEL ASSEMBLIES

REFERENCE TO RELATED APPLICATION

The present application claims priority to application No. GB 1102085.6 filed Feb. 7, 2011, all of the contents of which are hereby incorporated by reference in their entirety.

This invention relates to solar panel assemblies which comprise a plurality of photovoltaic panels each supported by or within a frame for location on a relatively flat roof or other supporting surface, and in particular to such assemblies in which no penetrations of the supporting surface are required to retain the solar panel assemblies in place, each frame of an assembly being designed to resist wind uplift forces thereby to retain the solar panel assembly in place. More specifically, the invention relates to such a frame for a photovoltaic panel of a solar panel assembly.

Roof mounted solar panel assemblies are well known. These assemblies generally comprise a multiplicity of individual modules each comprising a photovoltaic panel supported by or within one or more inclined frames with each frame physically linked to its neighbor or neighbors to provide an assembly of, for example, 50 or more individual modules. This assembly then has sufficient weight to provide stability to resist movement relative to the supporting surface other than during extreme weather conditions.

Examples of such assemblies can be found in European Patent Application EP1597765, and in U.S. Pat. Nos. 5,746, 839 and 5,706,617. EP1597765 discloses a solar panel frame in which a photovoltaic panel is supported within a tray which forms part of the frame, the tray separating the underside of the panel from the supporting roof surface. Other examples can be found in European Patent Applications EP2056359, EP2042822 and EP2216829, International Patent Applications WO2005/117142 and WO2010/097406, US Patent Application US2005/0217716, and Japanese Patent Application JP59077253.

U.S. Pat. No. 5,746,839 discloses an assembly in which photovoltaic panels are supported on spaced supports between which air is encouraged to flow, this airflow passing through the spaces defined below the panels and the opposed roof surface. U.S. Pat. No. 5,706,617 discloses a roof system which comprises a plurality of linked solar panel assemblies.

In addition to the weight of the overall solar panel assembly, the stability of the assembly is significantly enhanced by ensuring that, in all weather conditions, the downward force applied to each photovoltaic panel of the assembly by its weight and by wind flowing over the exposed surface of the panel is greater than the sum of forces applied to the underside of the panel. The net downward force will vary depending on the prevailing wind direction.

In, for example, U.S. Pat. No. 5,746,839 this pressure difference is achieved in part by seeking to equalise the pressures above and below each photovoltaic panel by maintaining the air flow conditions above and below the panel substantially equal. Thus, the frames on which the panels are mounted are designed to encourage air to flow under the panel of each module whereby the pressures exerted on the opposite sides of the panel are substantially balanced. This pressure balancing is referred to in U.S. Pat. No. 5,746,839 as fluid coupling.

In EP1597765 the required pressure difference is essentially achieved by preventing or minimizing the flow of air below the photovoltaic panels of the assembly thereby ensuring that the pressure below the photovoltaic panels is less than that exerted on the exposed panel surfaces even during inclement weather conditions.

Through this invention, the Applicant offers an alternative and improved way of preventing any tendency of the individual panel supporting frames, and consequently the solar panel assembly itself, to lift off from a supporting surface during periods of inclement weather.

A further problem experienced with known solar panel assemblies arises for reason that the dimensions of photovoltaic panels are not standardized. This means that differently sized supporting frames are often required to accommodate panels manufactured by different companies.

It is a preferred feature of this invention that dimensions of individual supporting frames can readily be changed to ensure that all, or a significant majority, of available photovoltaic panels can be accommodated in an assembly of solar panel supporting frames in accordance with this invention.

In one aspect the invention provides a supporting frame for a photovoltaic panel of a solar panel assembly, the frame comprising spaced side walls which taper upwardly from a nose section to a rear section of the frame, the rear frame section having an external surface which is generally curvilinear and terminates in a step whose riser is formed with at least one opening which places the frame interior in communication with the external atmosphere, and an internal partition wall which, when the frame is positioned on a supporting surface, defines with the internal surfaces of the rear frame section and at least parts of the side walls an internal space which is substantially closed to the atmosphere external to the frame interior apart from the said at least one opening, the inclined surfaces of the side walls being shaped and dimensioned to support in a sealed manner a photovoltaic panel.

The aforesaid "internal space" is hereinafter referred to as the "substantially enclosed internal space" of a frame.

Each side wall is preferably inclined outwardly from its upper edge to its lower edge to enable each frame to nest within another frame for ease of transportation and storage.

Each side wall may be inclined at an angle of between 7 and 15 degrees. A preferred angle is 10 degrees.

In an alternative arrangement, the side walls are vertical or substantially vertical.

Each side wall preferably includes an outwardly projecting flange which extends over the entire (or a substantial part of) length of the side wall and which, in use, overlaps with the flange of an adjoining frame for purposes of interconnection.

Each flange is preferably shaped to include one or more steps which locate within recesses of an adjoining frame when the frames are connected one to the other. Preferably the flanges are formed integrally with the frame.

The height of the flange to one side of each frame above ground level is preferably greater than the height of the flange to the other side of each frame by a distance equal to, or substantially equal to, the thickness of each flange.

In one arrangement the partition wall extends downwardly from the underside of the step to define with the internal surface of the rear frame section and parts of the side walls the aforesaid substantially closed internal space when the frame is positioned on a supporting surface.

In this arrangement the partition wall may comprise a sheet of a plastics or metallic material which extends downwardly from the underside of the step to a position in which its lowermost edge lies in contact with the surface on which the frame, in use, is supported. Support means being provided to assist retention of the partition wall in place.

At least one drainage aperture may be formed in the lower edge of the partition wall.

In an alternative arrangement, the partition wall extends lengthwise of the frame between the side walls from the step towards the nose section to define with the side walls and the interior of the frame rear section the aforesaid substantially closed internal space when the frame is positioned on a supporting surface. In this arrangement, the underside of the photovoltaic panel preferably lies directly above the lengthwise extending partition wall.

The upper edge of each side wall is preferably formed with recesses for the passage of cabling.

A plurality of equally spaced, or substantially equally spaced, openings may be formed in the step riser.

The rear and nose sections of the frame are preferably formed with outwardly projecting flanges which carry fixings for attachment to complementary fixings of adjoining solar panel frames.

The frame may be produced from a plastics material by an injection moulding or thermoforming process.

In an alternative arrangement, the frame may be produced from a metallic material such as aluminium or galvanized steel, or a combination of a plastics material and one or more metallic materials. Thus, the nose and rear frame sections and the step may be produced from a metallic material (for example aluminium or galvanized steel) or a plastics or other material clad or coated externally with a metallic material. The material may alternatively comprise a layer of a plastics or similar material sandwiched within layers or coatings of a metallic material. In this arrangement, the side walls may be produced from a plastics material or a metallic material.

The side walls of the frame are preferably aligned generally parallel one with the other.

Each supporting frame is preferably symmetrical (or substantially symmetrical) about a centre line drawn parallel or substantially parallel to the frame sides and is otherwise so shaped and dimensioned that a widthwise extending portion of the frame can be removed by cutting or otherwise separating along a line parallel or substantially parallel to one side edge of the frame, the remaining frame part then being attached along the cut side edge to the adjoining interlocking side edge of a neighboring frame.

This enables an array of photovoltaic panels to be accommodated within an assembly of panel frames no matter what the length and/or width of each individual panel is.

This feature substantially removes the need to construct frames to a variety of dimensions to accept differently sized photovoltaic panels.

As mentioned above, frames in accordance with the invention are preferably produced by an injection moulding or thermoforming technique. Either technique has a relatively high production rate and allows for a greater flexibility in design features when compared with the more conventional techniques employed in the past. Furthermore, injection moulding enables the frames to be produced from a relatively inexpensive material such as UV stabilized Polypropylene.

In one arrangement, each frame including its nose and rear sections is produced as a single piece by one of the techniques mentioned above. The nose and rear frame sections and the step may subsequently be clad or coated with a metallic material such as aluminium or galvanized steel.

In an alternative arrangement, individual frame walls may be produced from a plastics material by one of the mentioned techniques with those parts of the frame which will, in use, be exposed to UV light to the extent that they may discolour or be damaged, being produced separately from a metallic material such as aluminium or galvanized steel. The frame parts are then assembled by any one of several known procedures.

In another aspect, the invention provides a solar panel module which comprises a photovoltaic panel supported on a frame for location on a generally flat supporting surface, the frame comprising two generally parallel side walls which taper upwardly from a nose section to a rear section of the frame to provide support for the photovoltaic panel above a supporting surface, and means for connecting the frame to adjoining frames of a solar panel assembly, the rear section having a curvilinear surface which terminates in a step which extends between the side walls of the frame and is formed in its riser with at least one opening which places the interior of the frame rear section in communication with the external atmosphere, and a partition wall which, when the frame is positioned on a supporting surface, extends either downwardly from the step towards the supporting surface or lengthwise of the frame from the step towards the nose section to define with the two side walls (or parts thereof) the aforementioned substantially enclosed space which is closed to the external atmosphere other than through the at least one opening.

The supporting surface may comprise a relatively flat roof of a building.

In a further aspect, the invention provides a supporting frame for a photovoltaic panel of a solar panel assembly, the frame comprising spaced side walls which taper upwardly from a nose section to a rear section of the frame, the rear frame section having an external surface which is generally curvilinear and terminates in a step whose riser is formed with at least one opening which places the frame interior in communication with the external atmosphere, the external surfaces of the nose and rear frame sections being produced from or faced or coated with a metallic material and the remaining frame parts being of a plastics material.

In a still further aspect, the invention provides a method of manufacturing a supporting frame for a photovoltaic panel having spaced side walls which taper upwardly from a nose section to a rear section of the frame, the rear section having an external surface which is generally curvilinear and terminates in a step whose riser is formed with at least one opening which places the frame interior with the external atmosphere, the method comprising the steps of producing by injection moulding a plastics material plurality of individual side walls, separately producing by extrusion of a metallic material nose and rear frame sections and a step, and fastening the nose and rear frame sections and the step to the side walls.

The invention will now be described by way of example only with reference to the accompanying diagrammatic drawings in which.

In all of the embodiments described below, the same reference numerals are used for the same or equivalent features of the described frames.

Figure 1:
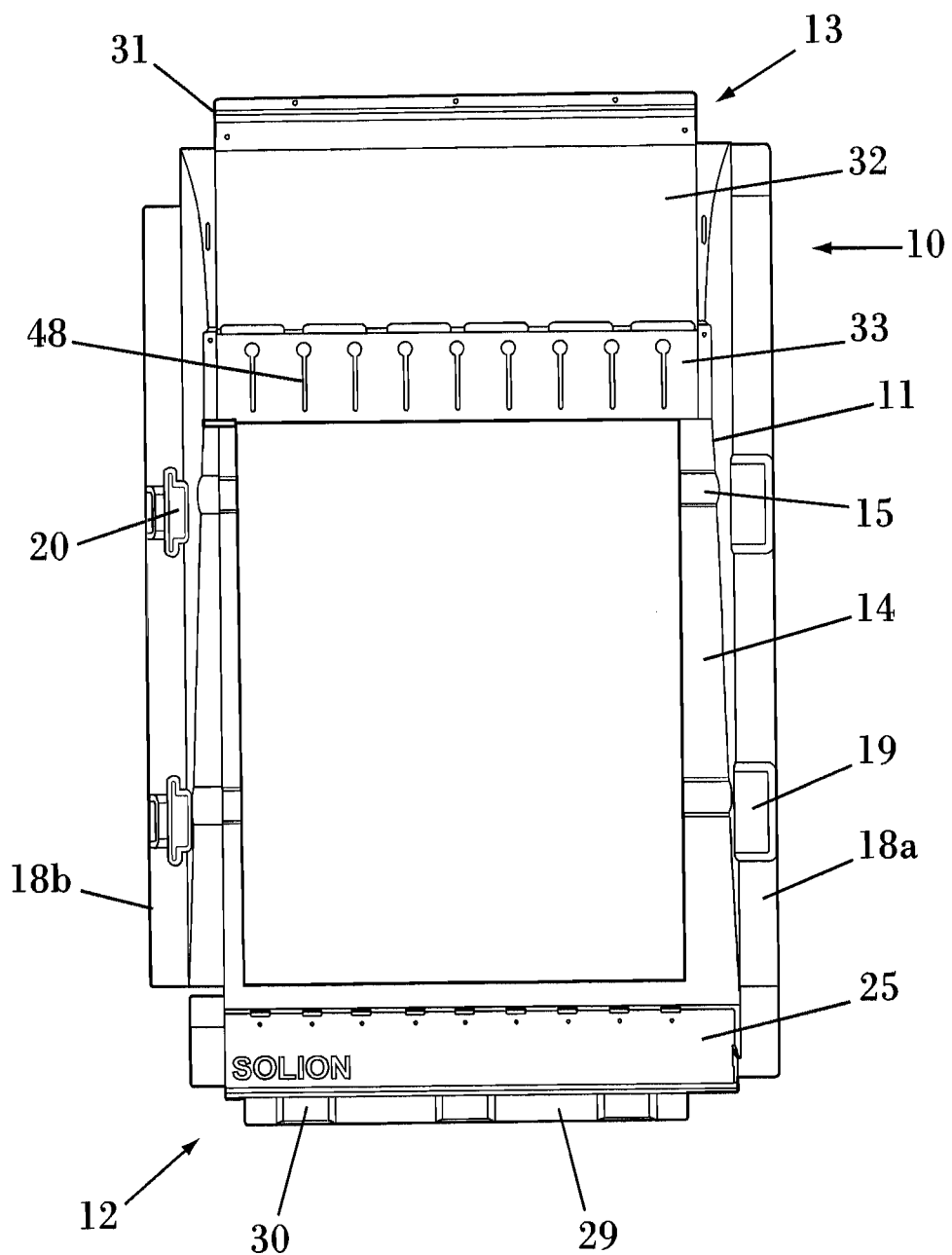
FIG. 1 is a plan view from above of a frame in accordance with the invention for supporting a photovoltaic panel.
Figure 2:
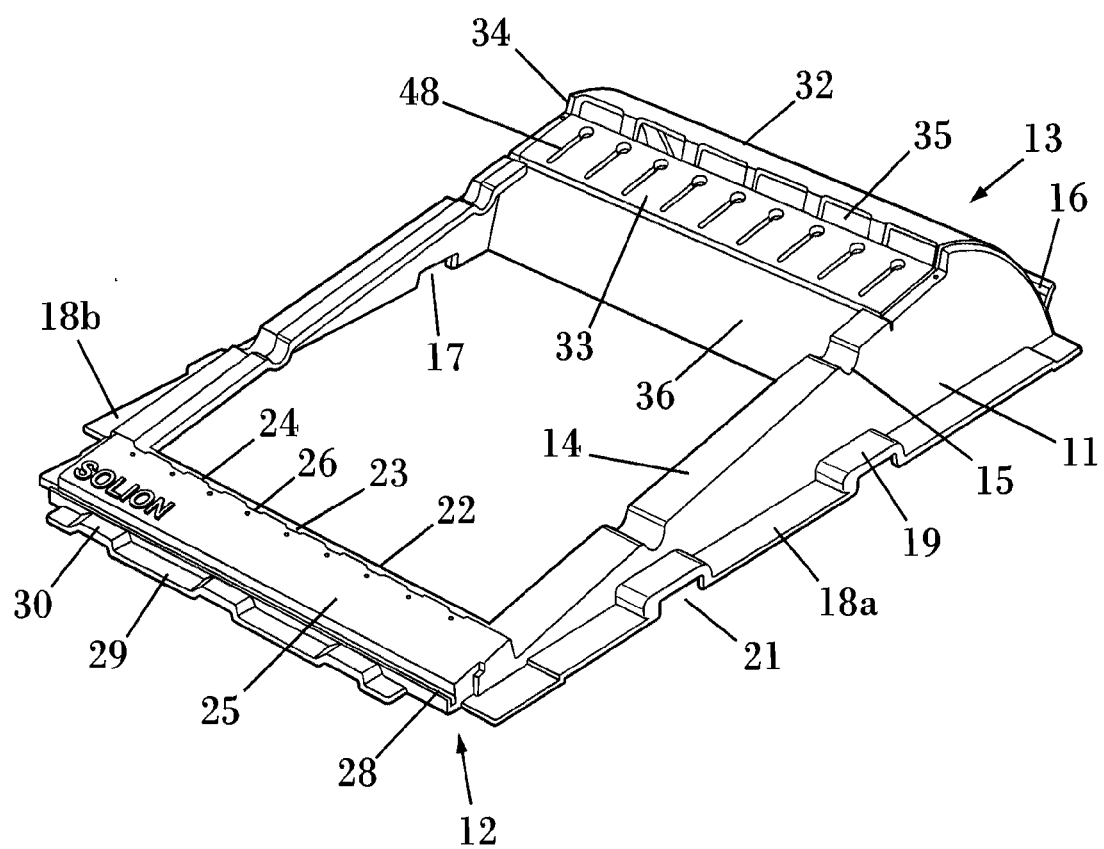
FIG. 2 is a perspective view from above of the supporting frame shown in FIG. 1.

The solar panel supporting frame 10 illustrated in FIGS. 1 and 2 comprises side walls 11 which, as will be seen from FIG. 2, taper upwardly from a nose section 12 to a rear or back section 13 of the frame. Each side wall 11 is generally triangular in plan and has an upper edge surface 14 which, in use of the frame 10, provides support for a photovoltaic panel (not shown) to be partially or wholly supported by the frame 10.

Channels 15 are provided in each edge surface 14 to enable electricity carrying cables to pass from one frame to an adjoining frame or frames. The rear edge 16 of each side wall is curvilinear.

The underside of the frame 10 is open, the frame being supported by the lower edges of the side walls 11 and those of the nose and rear frame sections.

Each side wall 11 is inclined to the vertical at a relatively shallow angle to enable several frames 10 to nest one within another for ease of storage and transportation. This angle is preferably within the range 7 to 15 degrees, with 10 degrees being preferred. Formed in the lower edge of each side wall are one or more drainage holes 17 to enable condensate or other fluids to leave the frame interior.

Projecting outwardly from the base of each side wall 11 is a side flange 18a, 18b. Flange 18a is shaped to define two spaced steps 19 and recesses 21, and flange 18b is formed with steps 20. The wall thickness of each side flange 18a, 18b is the same but the height above ground level of the flange 18a is greater than that of flange 18b by an amount equal to the flange wall thickness to enable the flange 18a to fit snugly over the flange 18b of the adjoining frame thereby enabling each frame to sit securely on the supporting roof surface.

When so fitted, the recesses 21 of the flange 18a locate over the steps 20 of the lowermost flange 18b, the sides of the recesses 21 being shaped and/or dimensioned to receive the steps 20. When assembled as described, the superimposed side flanges 18a, 18b may be secured together by, for example, screws. Other forms of fixings may, however, be employed.

The flanges 18a, 18b may be formed integrally with the side walls 11 of the frame. Alternatively, they may be formed separately and then secured to the frame at a later stage.

The nose frame section 12 includes an inner wall 22 which extends between the two side walls 11 with its upper surface defining a ledge 23 able to support one side of a photovoltaic panel. The wall 22 is bordered by a step 24 against which a side edge of a supported photovoltaic panel can locate.

Extending forwardly of the step 24 is the upper surface 25 of the nose section 12. This surface 25 is formed along its edge adjacent the step 24 with a series of recesses 26 which receive clips to assist retention of a photovoltaic panel on the supporting frame. Holes are formed in the surface 25 to receive screws for securing the clips in place. Alternative forms of fixings may be employed.

The upper surface 25 of the nose section 12 inclines downwardly to a step formed with a drainage channel 28 and an outwardly projecting nose flange 29 formed with steps 30. The nose flange 29 is similar to the side flange 18a and co-operates with a complementary rear flange 31 of an adjoining frame to enable the nose and rear sections of the frames to be secured together with screws or other similar fixings. Cooperating nose and rear section flanges can be seen in FIG. 11.

The rear frame section 13 includes a curved, preferably arcuate, upper surface 32 whose sides blend with the rear edges 16 of the side walls 11. The curvilinear surface 32 terminates in a step 33 whose riser 34 is formed with a plurality of openings 35. Although six such openings are shown in FIG. 2, a greater or lesser number of openings may be provided.

The step 33 projects from the base of the riser 34 to define a ledge which extends across the full width of the frame between the side walls 11. This step provides support for a photovoltaic panel supported on the frame. Projecting downwardly from the edge of the step remote from the riser 34 is a partition wall 36. In use of the frame, the lower edge of the partition wall lies in contact with the surface of the roof on which the frame is supported.

As will be appreciated from the above description, when the frame is positioned on a supporting roof surface, the inner face of the partition wall 36 defines with the inner face of the curvilinear surface 32 of the rear frame section 13 and those portions of the side walls 11 which border the rear frame section an internal space which is substantially closed to the atmosphere external to the frame interior apart from the openings 35. As previously mentioned, this space is referred to herein as the "substantially enclosed internal space".

Figure 3:
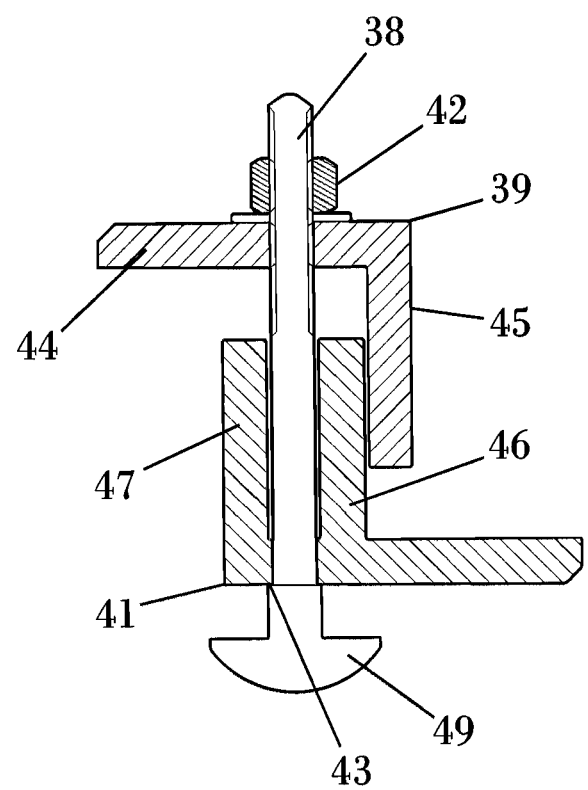
FIG. 3 is a side view in section of a clamp which forms part of the illustrated frames.

Positioned below the step 33 is the clamp illustrated in FIG. 3 of the drawings. The clamp comprises a bolt 38 on which is supported an internally threaded upper member 39 and a lower member 41. The upper end of the bolt is threaded to receive complementary threads of the upper member and a nut 42. A washer is positioned between the opposed surfaces of the bolt and the upper member. Turning the nut drives the upper member 39 vertically relative to the bolt either towards or away from the lower member 41.

The lower member 41 sits on an annular shoulder 43 of the bolt 38. The upper section includes a forwardly projecting arm 44 (that is towards the nose section 11 of the frame) and a downwardly projecting arm 45 which lies in contact with an upwardly projecting arm 46 of the clamp lower member 41. The lower member includes an upwardly extending plate 47 which, in use of the frame, acts as a support for the partition wall 36.

In use, the bolt 38 protrudes through a selected one of several elongate slots 48 formed in the step 33. When a photovoltaic panel is positioned on the frame, one of its sides is supported by the step 33. With the panel in position, the clamp is moved along the slot in which the bolt 38 is located until the arm 44 overlaps the side of the step 33 and the outer face of the plate 47 abuts the inner face of the partition wall 36. Turning the nut 42 urges the underside of the arm 44 into clamping contact with the photovoltaic panel and drives the head 49 of the bolt into contact with the roof surface on which the frame is mounted. Thus, the clamp 37 serves to assist in retaining the photovoltaic panel in position and provides support for the partition wall 36 through the plate 47. Two or more clamps would normally be employed in each frame.

The clamp 37 is typically produced from steel or a like material and the upper and lower frame members 39, 41 are typically extrusions of the same sections.

Figure 4:
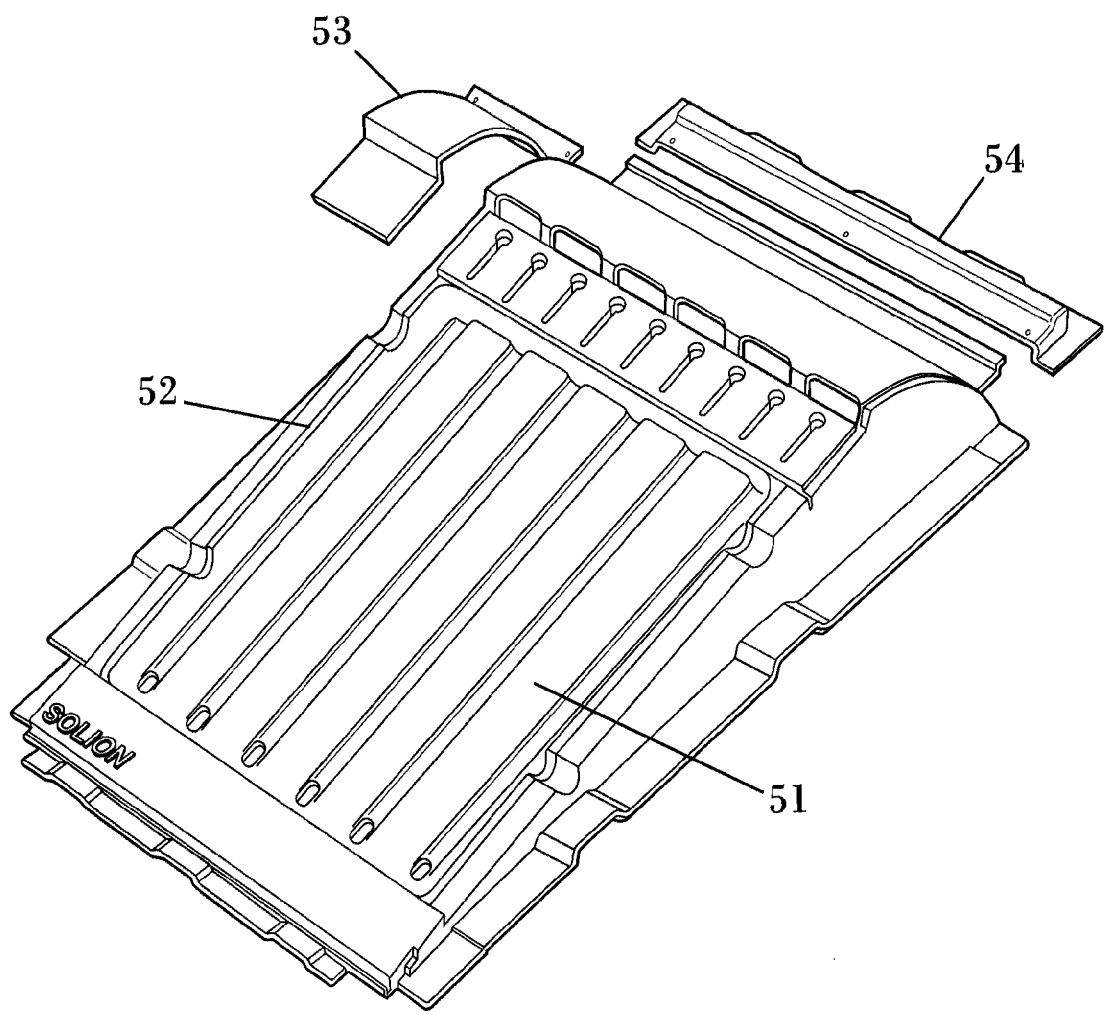
FIG. 4 is a perspective view from above of an alternative frame in accordance with the invention.

In the alternative frame illustrated in FIG. 4 a lengthwise extending partition wall 51 replaces the partition wall 36 illustrated in FIGS. 1 and 2. The partition wall 51 is formed with a lip 52 which is supported on the side wall surfaces 14, the lip 23 and the edge of the step 33. In use, a photovoltaic panel locates immediately on and above the partition wall 51.

The partition wall acts in the same way as the partition wall 36 except that the aforementioned substantially enclosed space of the frame interior comprises not only the space below the end section 13 but also the area defined below the partition 51.

Thus, in the embodiment illustrated in FIG. 4, when the frame is located on a supporting roof surface, the underside of the partition wall 51 defines with the inner surfaces of the side walls 11 and the underside of the curvilinear surface of the rear section 13 the aforementioned substantially enclosed space which is closed to the atmosphere external to the frame interior apart from the openings 35. This space is therefore equivalent to that previously described with reference to FIGS. 1 and 2.

Also illustrated in FIG. 4 are an arch cover 53 and a rear cover 54. These will be described below with reference to FIGS. 7A, 7B, 8A and 8B of the accompanying drawings.

Figure 5:
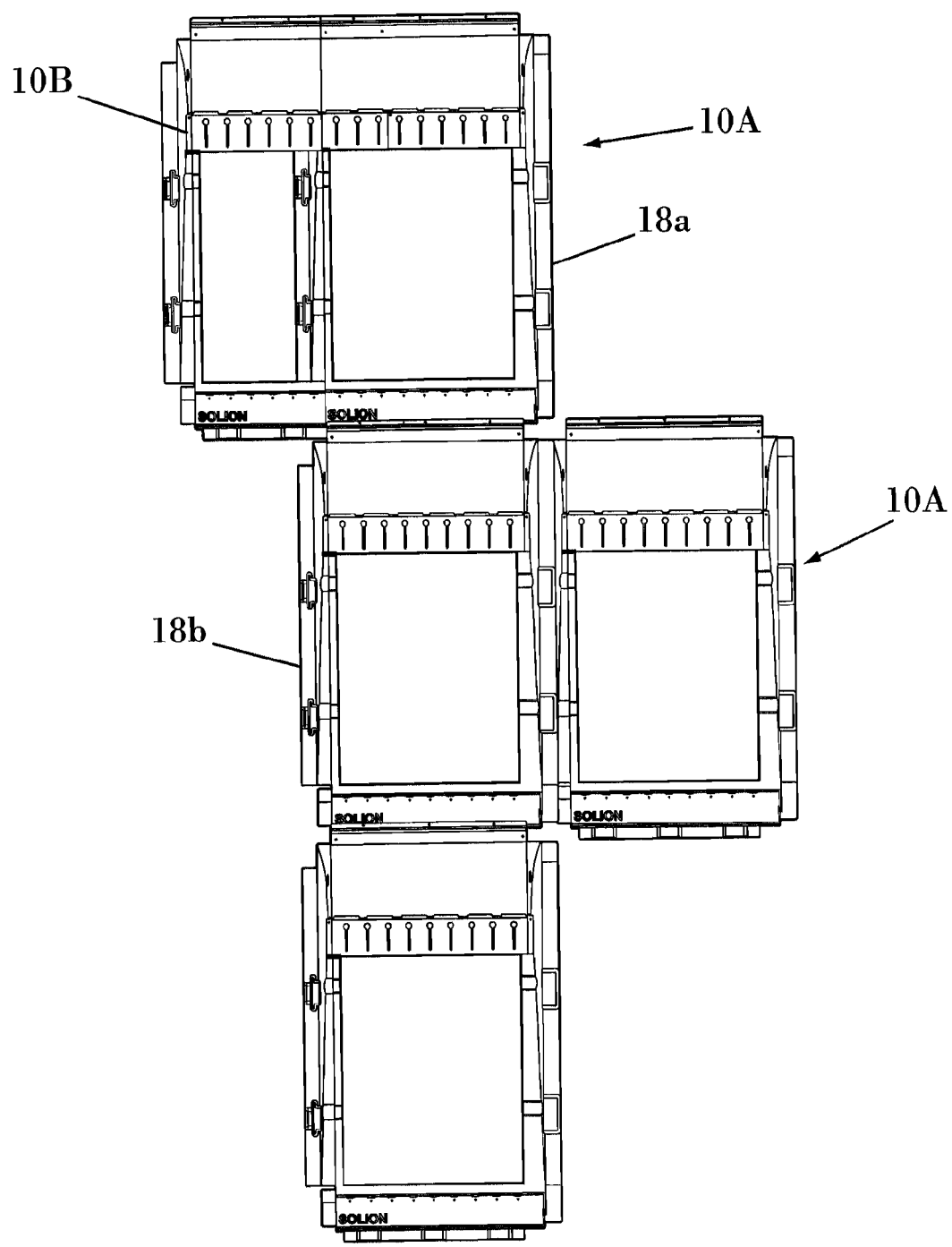
FIG. 5 is a plan view from above of several interlocked supporting frames in accordance with the invention, one such frame being of reduced width.

FIG. 5 illustrates an assembly of four equally dimensioned panel frames 10A and one 10B whose width is less than that of frames 10A. The previously described connections between the nose and rear sections of one frame and those of adjoining frames can be seen from this Figure. The overlapping side flanges 18a, 18b of adjoining frames can also be seen.

As mentioned previously, a problem experienced with known solar panel assemblies arises for reason that the dimensions of photovoltaic panels are not standardised. This means that differently sized supporting frames are often required to accommodate panels manufactured by different companies. It is a feature of this invention that dimensions of individual supporting frames can readily be changed to ensure that all, or a significant majority, of available photovoltaic panels can be accommodated in an assembly of solar panel supporting frames in accordance with this invention.

Photovoltaic panels are generally rectangular in plan and, when located on an assembly of frames, the panels are positioned end to end lengthwise of the assembly with their major axes normal to the major axis of each frame. This means that the overall length of the required assembly can be varied simply by cutting a frame lengthwise to the required width and interlocking this cut frame section to another frame of the assembly so that the overall length of the assembly is commensurate with a multiple of the widths of the panels.

As shown in FIG. 6, cut frame 10B is simply connected to the left hand side of the adjoining frame 10A to increase the overall width of the assembly as required. Other frames are similarly cut and attached to neighboring frames 10A to complete the required assembly.

As described previously, the side wall flanges 18a, 18b of adjoining frames shown in FIG. 5 overlap and lie flat on the surface of the supporting roof surface thereby preventing any penetration of wind which might otherwise tend to cause lifting of the frames from the supporting surface.

Spaces are, however, present between the adjacent edges of the rear sections of the frames and the side, front and rear edges of those frames which border the assembly.

Figure 6A:
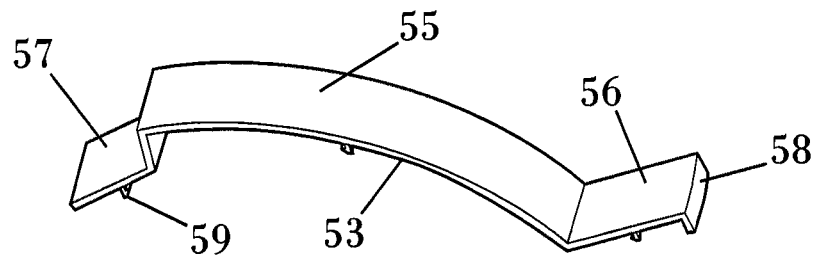
FIGS. 6A and 6B are respectively perspective and side views of the upper surface and side edge of an arch cover for use with supporting frames in accordance with the invention.
Figure 6B:
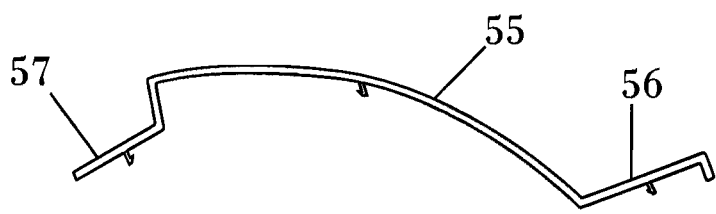

To prevent wind penetration into these spaces when the prevailing wind direction is towards the rear frame section, the arch covers 53 illustrated in FIG. 4 and FIGS. 6A and 6B are provided. As will be seen from these Figures, each arch cover 53 is formed with an arcuate section 55 positioned between end flanges 56 and 57. The shape of the section 55 is the same or substantially the same as that of the upper surface 32 of the rear frame section 13 whereby it sits snugly over or alongside the sides of this surface and that of the adjoining frame when assembled.

The end flange 56 is provided with a lip 58 which, on assembly, closes the rearmost end of the arch cover. The end flange 57 extends forwardly towards the nose section 12 and, when assembled, locates alongside the steps 33 of adjoining frames. Lugs 59 are provided which locate in suitably positioned openings formed in the adjoining frames to fix the arch covers in place. The arch covers therefore close off spaces which would otherwise exist between adjoining frames.

Figure 7A:
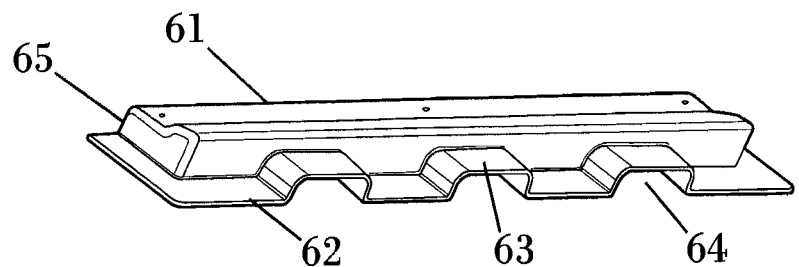
FIGS. 7A and 7B are respectively perspective and plan views of a rear cover for use with supporting frames in accordance with the invention.
Figure 7B:
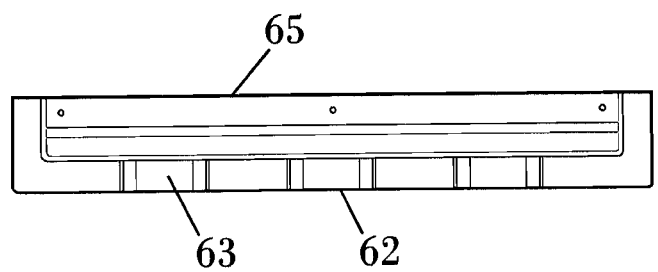

The nose and rear sections 12, 13 of the frames 10 which border the assembly are sealed by edge strips 61 as illustrated in FIGS. 7A and 7B. Each edge strip has a lengthwise extending flange 62 formed with steps 63 and recesses 64, the flange 62 being shaped to complement the edge flanges 29, 31 of each nose and rear frame section 12, 13. Those sides of the edge strips which border the assembly are closed by an end wall 65 whose lower edge lies directly in contact with the supporting roof surface. Fixings are provided to secure the edge strips to the outermost frames of the assembly.

Figure 8A:
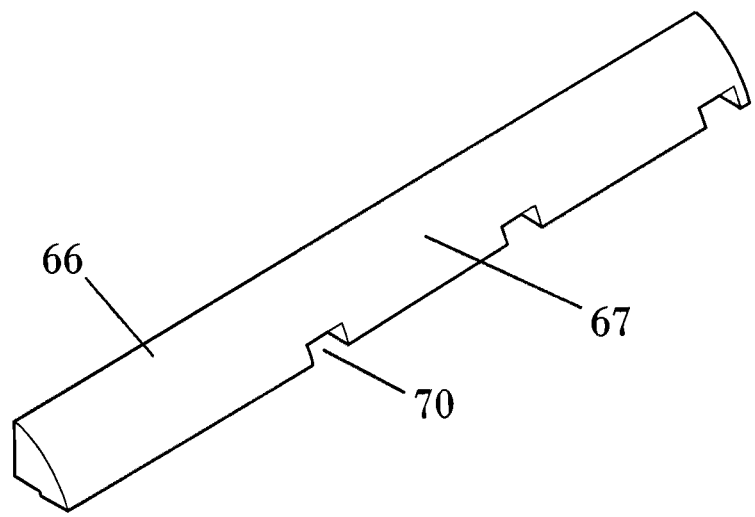
FIGS. 8A and 8B are respectively perspective views of the upper and under surfaces of an edge deflector for use with supporting panels in accordance with the invention.
Figure 8B:
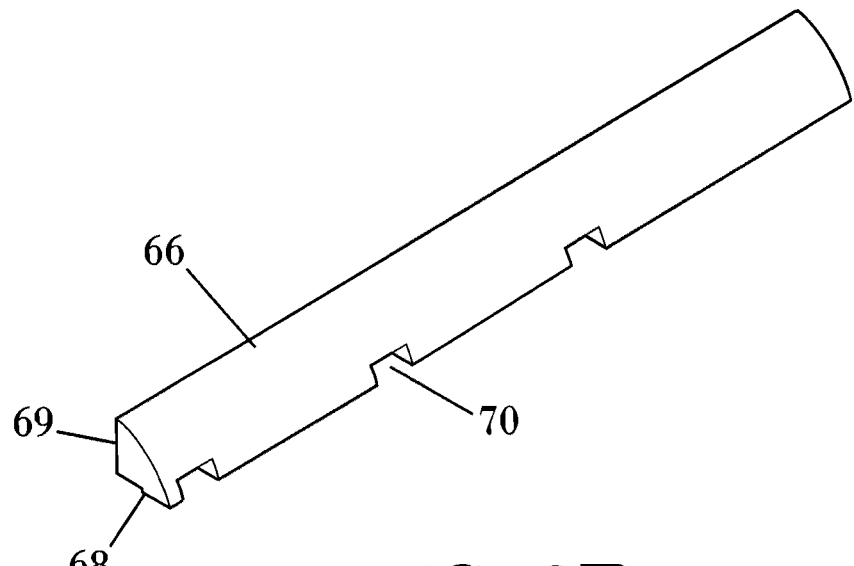

Edge deflectors 66 for use with the described frames are shown in FIGS. 8A and 8B of the drawings. These deflectors 66 are, in use, positioned on and alongside those frame side edges which border the assembly. Each edge deflector is formed with a curved outer surface 67 and under and side surfaces 68, 69 which respectively sit on and alongside the side flanges 18a and 18b of those frames which border a frame assembly.

The edge deflectors are preferably produced from a concrete or like material and act as ballast to assist in retaining the assembly in place during inclement weather conditions. Drainage channels 70 are provided in the edge deflector. The curved surface 66 deflects wind away from the sides of the frames and over the frame upper surfaces when the prevailing wind direction is towards the side walls of the frames.

The frames illustrated in FIGS. 1, 2, 4 and 5 are typically produced from a plastics material such as ultra violet stabilised polypropylene and are preferably produced by an injection moulding technique. This technique provides the advantages of significantly reducing production costs and maximising production rates. This technique also provides greater flexibility in design features when compared with more conventional forming techniques. Injection moulding also enables less expensive plastics materials such as UV stabilised polypropylene to be used.

In locations where a plastic material would tend to degenerate or discolour in use when exposed to high levels of UV light (for example in territories subject to high temperatures and high humidity) other materials can readily be employed particularly for those parts of the frames which are exposed in use to the atmosphere.

Figure 9:
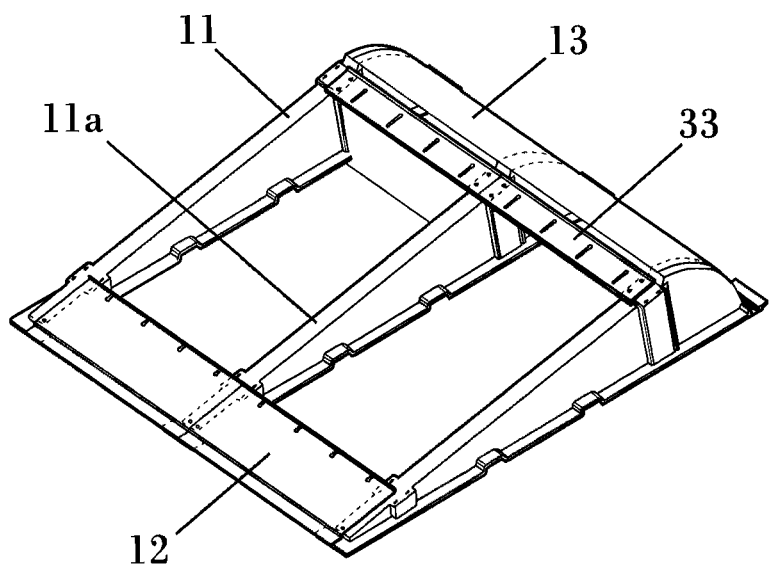
FIG. 9 is a perspective view from above of an alternative frame in accordance with the invention.

A frame which includes both plastics and metallic components is illustrated in FIG. 9. This frame also differs from those described previously in that it includes a central wall or pedestal 11a. This wall provides additional support for a photovoltaic panel when mounted on the frame.

In this embodiment, the exposed surfaces of the nose and rear sections 12, 13 and the step 33 are produced from a metal such as aluminium or galvanised steel, or from a material faced with a layer of such metal, or from materials which comprise a layer of plastics or other material sandwiched between sheets of aluminium, galvanized steel or other metal, or from plastics or other material coated with an external layer of a metallic material. The metallic facing provides protection against ultraviolet light. The parts not immediately exposed to the atmosphere, such as the side and partition walls are typically produced from a plastics material as used, for example, for the frames of FIGS. 1 and 2. Also, the walls 11, 11a are not necessarily inclined and may be vertical or substantially so.

The frame illustrated in FIG. 9 can be produced as a single injection moulded or thermoformed piece with those parts which in use of the frame exposed to the effects of ultraviolet light being subsequently faced or coated with a metallic material as described. Alternatively it could be produced using separate components as shown in FIG. 10.

Figure 10:
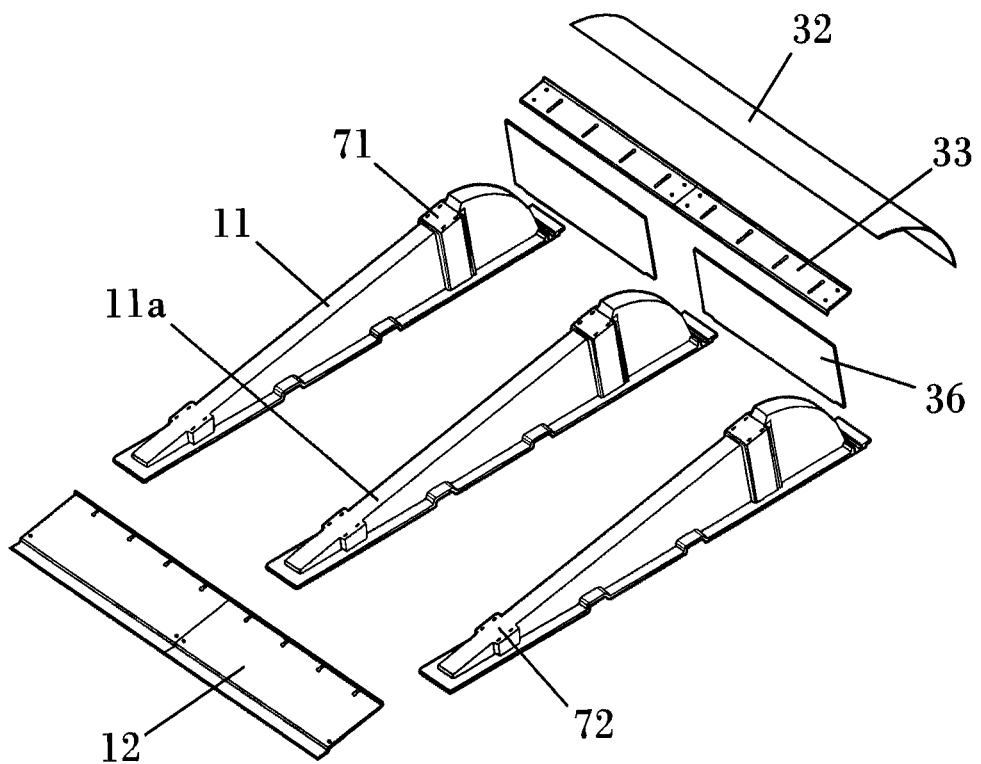
FIG. 10 illustrates the individual components of the frame illustrated in FIG. 9 before assembly.

In the FIG. 10 embodiment, the side walls 11, 11a which are not exposed to ultraviolet light in use are produced from a plastics material by an injection moulding or thermoforming technique. Metal brackets 71 are secured by welding or other known technique to those parts of the walls 11, 11a which will, on assembly of the components, support the step 33. The upper face of each bracket 71 is formed with holes to receive screws or other fixings for securing the step to each wall 11,11a. Similar brackets 72 are secured to the upper surfaces of the side walls where these support the nose section 12 of the frame. Other than for the presence of the brackets 71, the side walls are identical to those described previously with reference to FIGS. 1 to 4.

The nose section 12, the step 33 and the curved surface 32 of the rear frame section 13 are produced from a metal such as aluminium or galvanized typically by an extrusion process. The partition wall 36 may be produced from either a plastics or metallic material.

To assemble the frame from the components illustrated in FIG. 10, the nose section 12 is located over the brackets 72 and secured in place, and the step 33 is similarly located on the brackets 71 with the end of the curved wall of the rear frame section 13 trapped below the step 33 and then secured in place.

Figure 11:
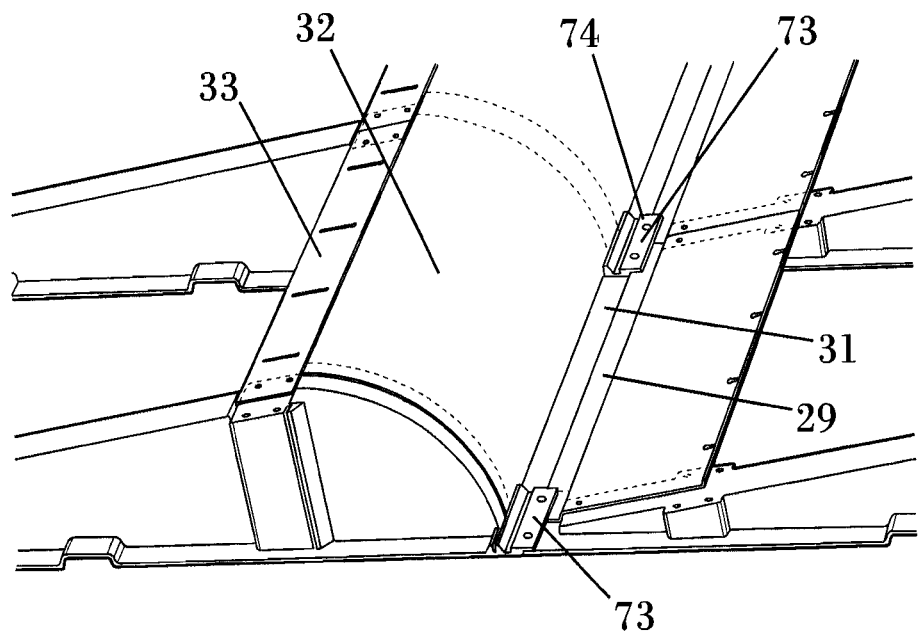
FIG. 11 shows a connection between the nose and rear sections of frames as illustrated in FIG. 9.
Figure 12:
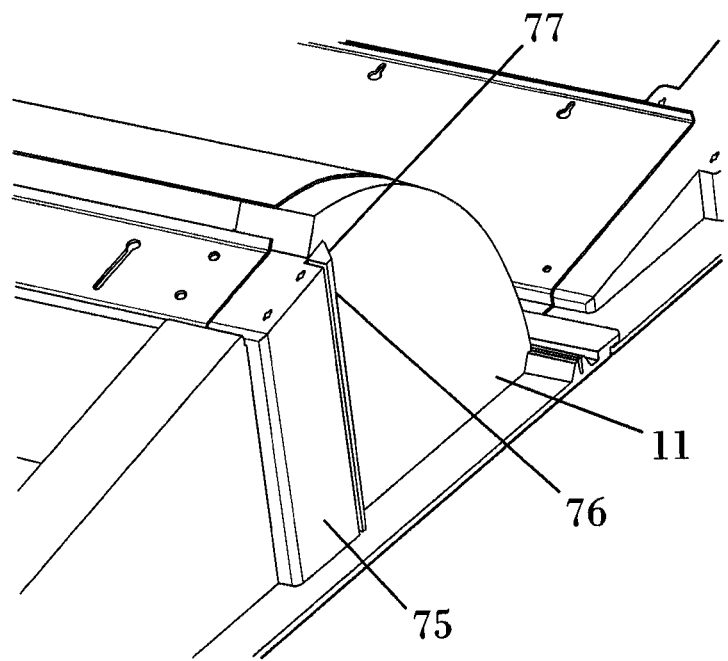
FIG. 12 shows a detail of the frame illustrated in FIG. 9.

Connections between the rear and nose sections of two adjoining frames can be seen from FIGS. 11 and 12. The flange 31 of the rear section 13 carries clips 73 formed with screw holes 74 for connecting the flange 31 of the rear frame section to the flange 29 of the nose section of the adjoining frame. As will be seen most clearly from FIG. 12, the slot created by the downwardly extending end 75 of the step 33 is filled with a baffle 76 whose inclined surface 77 serves to deflect air flowing between adjoining frames.

In use, an assembly comprising a multiplicity of individual solar panel modules is located on a roof surface with each frame 10 connected to the adjacent frame or frames to define a unitary assembly with no roofing penetrations required to retain the assembly in place. Displacement of the assembly from the roof surface is prevented firstly by the overall weight of the assembly and secondly by ensuring that the pressure of air below each frame is not greater than that exerted on the frame and panel exteriors in all weather conditions.

The latter is achieved by preventing or severely limiting the flow of air into the aforementioned substantially enclosed internal space of each frame particularly when the prevailing wind direction is towards and over the rear sections of the frames of the assembly. In such conditions, there is a tendency for the pressure applied to the outer surfaces of the photovoltaic panels to be reduced so increasing the possibility of the frame mounted panels to lift off from the supporting roof surface.

With frames in accordance with this invention, in such inclement weather conditions, the wind accelerates over the curvilinear surface 32 of each rear frame section 13 and separates from this surface as it reaches the step 33. This creates low pressure conditions at the openings 35 formed in the riser 34 to suck air from the aforementioned substantially enclosed internal space of each frame. This ensures that the net downward force applied to outer panel surfaces remains above any forces applied to the inner surfaces of the panels.

In other words, the low pressure conditions created at the openings 35 cause air within each substantially enclosed internal space bordered by the side walls 11, the inner surface of the curvilinear surface 32 of the nose section and the partition wall 36 or 51 to evacuate the substantially enclosed internal space thereby creating a vacuum (or near vacuum) which urges the frame into contact with the roof surface.

The pressure difference thereby created between the upper and lower surfaces of the frames and panels urges each frame downwardly thereby offsetting any tendency for the assembly of frames and panels to lift off from the supporting roof surface.

It will be appreciated that the foregoing is merely exemplary of solar panel assemblies in accordance with the invention and that modifications can readily be made thereto without departing from the invention as set out in the appended claims.

The invention claimed is:

1. A supporting frame for at least one photovoltaic panel of a solar panel assembly for location on a relatively flat surface, the frame comprising:
at least one side wall which tapers upwardly from a nose section to a rear section of the frame, thereby defining an inclined upper surface, the inclined upper surface being formed with an edge surface which is shaped and dimensioned to support the at least one photovoltaic panel in a sealed manner, characterized in that
at least one channel is formed in the edge surface of the inclined upper surface of the at least one side wall to enable cabling to pass therethrough,
the upper and lower surfaces of the supporting frame are open when the supporting frame is not in use and are closed respectively by the at least one photovoltaic panel and the relatively flat surface when the supporting frame is in use, and
wherein the rear section has an external surface which is generally curvilinear and which terminates in a step that has a riser that is formed with at least one opening which, in use of the supporting frame, places the otherwise closed frame interior in communication with the external atmosphere.

2. A frame as claimed in claim 1, further comprising
an internal partition wall which, when the frame is positioned on a supporting surface with the photovoltaic panel supported by the at least one side wall, defines with internal surfaces of the rear frame section and at least parts of the side wall, an internal space which is substantially closed to the external atmosphere apart from the at least one opening.

3. A frame as claimed in claim 1, wherein
the side wall is inclined outwardly from an upper edge to a lower edge to enable the frame to nest within another frame.

4. A frame as claimed in claim 3, wherein the side wall is inclined at an angle of between 7 and 15 degrees to the vertical.

5. A frame as claimed in claim 4, wherein
the angle is 10 degrees.

6. A frame as claimed in claim 1, wherein
the side wall includes an outwardly projecting flange which extends over substantially the entire length of the side wall and which, in use, overlaps the flange of an adjoining frame.

7. A frame as claimed in claim 1, wherein
an underside of the photovoltaic panel lies directly above the relatively flat surface on which the frame is supported.

8. A frame as claimed in claim 2, wherein
the partition wall extends lengthwise of the frame between the side wall from the step towards the nose section to define with the side wall and the interior of the rear frame section, a substantially closed internal space when the frame is positioned on the relatively flat surface with the photovoltaic panel supported by the side wall.

9. A frame as claimed in claim 8, wherein
an underside of the photovoltaic panel lies directly above the lengthwise extending partition wall.

10. A frame as claimed in claim 1, wherein
a plurality of substantially equally spaced openings is formed in the riser.

11. A frame as claimed in claim 1, wherein
the rear and nose sections are formed with outwardly projecting strips which carry fixings for attachment to complementary fixings of an adjoining frame.

12. A frame as claimed in claim 1, wherein
the supporting frame is substantially symmetrical about a center line drawn substantially parallel to the side wall of the frame and is otherwise so shaped and dimensioned that a width-wise extending portion of the frame can be removed by cutting or otherwise separating along a line substantially parallel to one side edge of the frame, the remaining frame part then being attachable along the cut side edge to an adjoining interlocking side edge of a neighboring frame.

13. A solar panel module which comprises a photovoltaic panel supported on a frame located on a relatively flat supporting surface, the frame comprising side walls, each side wall tapers upwardly from a nose section to a rear section of the frame to provide support for the photovoltaic panel above the supporting surface, and means for connecting the frame to adjoining frames of a solar panel assembly, the module being characterized in that
    the rear section has a concave curvilinear surface which terminates in a step which extends between the side walls of the frame and at least one opening formed in a riser of the step, the at least one opening placing the otherwise closed interior of the rear section in communication with the external atmosphere, and
    a partition wall which, when the frame is positioned on a relatively flat supporting surface, extends downwardly from the step towards the supporting surface to define with the side walls a space which, in use of the module, is closed to the external atmosphere other than through the at least one opening by the photovoltaic panel and the relatively flat supporting surface.

14. A supporting frame for at least one photovoltaic panel of a solar panel assembly for location on a relatively flat surface, the frame comprising:
    at least one side wall which tapers upwardly from a nose section to a rear section of the frame, thereby defining an inclined upper surface, the inclined upper surface being formed with an edge surface which is shaped and dimensioned to support the at least one photovoltaic panel in a sealed manner, characterized in that
    upper and lower surfaces of the supporting frame are open when the supporting frame is not in use and are closed respectively by the at least one photovoltaic panel and the relatively flat surface when the supporting frame is in use, and
    wherein the rear frame section has an external surface which is generally curvilinear and which terminates in a step that has a riser that is formed with at least one opening which, in use of the supporting frame, places the otherwise closed frame interior in communication with the external atmosphere, and further comprising
    an internal partition wall which, when the frame is positioned on a supporting surface with the photovoltaic panel supported by the at least one side wall, defines with internal surfaces of the rear frame section and at least parts of the side wall, an internal space which is substantially closed to the external atmosphere apart from the at least one opening,
    wherein the partition wall extends downwardly from an underside of the step to a position in which a lowermost edge thereof lies in contact with the relatively flat surface on which the frame, in use, is supported, and support means being provided to retain the partition wall in place.

* * * * *